US006340502B1

(12) United States Patent
Azzopardi et al.

(10) Patent No.: US 6,340,502 B1
(45) Date of Patent: Jan. 22, 2002

(54) HYDROPHOBIC COATING FOR GLAZING SHEET

(75) Inventors: Marie-Jose Azzopardi, Vincennes; Laurent Delattre, Paris; Nathalie Codazzi, Eaubonne, all of (FR)

(73) Assignee: Saint-Gobain Vitrage, Courbevoie (FR)

( * ) Notice: Subject to any disclaimer, the term of this patent is extended or adjusted under 35 U.S.C. 154(b) by 0 days.

(21) Appl. No.: 09/319,238

(22) PCT Filed: Oct. 6, 1998

(86) PCT No.: PCT/FR98/02123

§ 371 Date: Sep. 8, 1999

§ 102(e) Date: Sep. 8, 1999

(87) PCT Pub. No.: WO99/18168

PCT Pub. Date: Apr. 15, 1999

(30) Foreign Application Priority Data

Oct. 6, 1997 (FR) ............................................ 97 12410

(51) Int. Cl.⁷ .......................... C09K 3/18; C03C 17/30; C09D 183/08
(52) U.S. Cl. ............ 427/387; 106/287.14; 106/287.16; 427/389.7; 427/393.5; 427/407.2; 427/412.1; 427/412.3; 427/387; 427/164; 427/165
(58) Field of Search ....................... 106/287.14, 287.16; 428/428, 429, 447, 451; 427/387, 389.7, 393.5, 407.2, 412.1, 412.3, 163.1, 164, 165

(56) References Cited

U.S. PATENT DOCUMENTS 5,250,322 A * 10/1993 Takahashi et al. .......... 427/226
5,523,161 A * 6/1996 Goodwin ..................... 428/421

FOREIGN PATENT DOCUMENTS

| EP | 0 482 613 | * | 4/1992 |
| EP | 0 484 746 | * | 5/1992 |
| EP | 0492 545 | * | 7/1992 |
| EP | 0 719 743 | * | 7/1996 |

* cited by examiner

Primary Examiner—D. S. Nakarani
(74) Attorney, Agent, or Firm—Oblon, Spivak, McClelland, Maier & Neustadt, P.C.

(57) ABSTRACT

The invention relates to a composition for a hydrophobic/oleophobic coating containing at least one alkoxysilane and at least one halosilane, each having a perfluorinated group at at least one end of their molecule; it also relates to a process for forming a coating of this type on a substrate, as well as to this substrate itself when provided with its coating and, in particular, monolithic, laminated or multiple glazing at least in part provided with its coating.

24 Claims, No Drawings

HYDROPHOBIC COATING FOR GLAZING SHEET

BACKGROUND OF THE INVENTION

1. Field of the Invention

The present invention relates to a composition for a non-wettable coating, and to a process for applying it to a substrate. It applies preferentially to a substrate of this type which is transparent; in this regard, it therefore relates in particular to the manufacture of glazing provided with a non-wettable coating.

2. Description of the Background

The glazing relevant to the invention is glazing made of glass and/or plastic such as poly(methyl methacrylate) (PMMA), polyvinyl butyral (PVB), polycarbonate (PC) or polyurethane (PU). This glazing is used, in particular, in the aeronautical, railway or automotive fields. It can also be used in the building field or in the field of household fittings, for example for decorative panels, furniture, household electrical appliances (refrigerator and oven doors, windows) etc.

The wettability nature which is referred to pertains to the fact that polar or non-polar liquids adhere to the substrate and form an undesirable film. The term wettability is also used to describe the tendency of substrates to retain dust or dirt of all kinds, finger marks, insects, etc.

The presence of water and/or dirt gives an unattractive appearance, may reduce the transparency of the substrate, and may obscure vision through it. The latter points are particularly problematic when the substrate is glazing used in the field of transport.

The non-wettability of a substrate, more commonly referred to as its hydrophobic/oleophobic property, consists in the fact that the contact angles between a liquid and this substrate are high, for example at least 90° for water. The liquid therefore tends to flow readily over the substrate, in the form of drops, simply under gravity if the substrate slopes, or under the effect of aerodynamic forces in the case of a moving vehicle. Examples of agents which are known to impart this hydrophobic/oleophobic property are fluorinated alkylsilanes as described in patent applications EP 0 492 417, EP 0 492 545 and EP 0 672 779. According to these documents, the way in which this layer is obtained is that a solution containing fluorinated organosilanes in a non-aqueous organic solvent is applied to the surface of a substrate. As the non-aqueous organic solvent, document EP 0 492 545 cites, in particular, n-hexadecane, toluene, xylene, etc. These solvents are particularly suitable for a fluorinated chlorosilane. According to this document, it is also possible to use a methyl or ethyl alcohol as solvent when the fluorinated silane is a fluorinated alkoxysilane.

Particular examples of common hydrophobic/oleophobic agents are alkyl-trihalo- or -trialkoxy-silanes whose alkyl group includes at least one end that is perfluorinated, that is to say consisting of an $F_3C-(CF_2)-_n$ functional group, in which n is a positive integer or zero. For these, patent application EP 0 719 743 indicates perfluoro carbons as suitable solvents.

The hydrophobic/oleophobic agents are applied in known fashion in solution using conventional deposition methods, with or without heating.

Preparation of the substrate by a prior treatment using a primer of the tetrahalo- or tetralkoxy-silane type is also known and described, amongst others in application EP 0 484 746. The purpose of this is to improve the adhesion of the hydrophobic/oleophobic coating to the substrate.

One of the problems which arises most acutely in the field of the invention is that of the hydrophobic/oleophobic coating's erosion. This erosion takes place to a varying degree during the operations of cleaning the substrate, which it is essential to carry out occasionally, in particular to restore satisfactory vision through a transparent substrate. Constant attempts are therefore being made to slow down the progressive removal of the aforementioned types of hydrophobic/oleophobic coatings, which occurs in particular under the action of windscreen wipers. Furthermore, this type of removal may also result from degradation by ultraviolet radiation.

SUMMARY OF THE INVENTION

The inventors have succeeded in creating a hydrophobic/oleophobic coating which is especially suited to inorganic or organic transparent substrates, i.e. substrates made of glass or plastic, this coating being distinguished by excellent bonding and abrasion-resistance properties.

DETAILED DESCRIPTION OF THE PREFERRED EMBODIMENTS

To this end, the invention relates to a composition for a hydrophobic/oleophobic coating which is characterized in that it contains simultaneously at least one alkoxysilane and at least one halosilane, each having a perfluorinated group at at least one end of their molecule.

Advantageously, the alkoxysilane and halosilane respectively satisfy the following formulae (I) and (II):

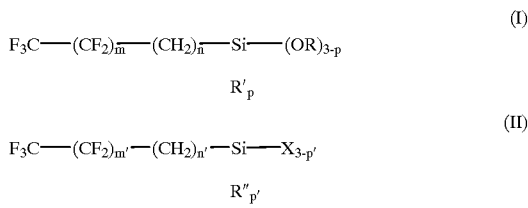

in which:

m and m', which are identical or different, are between 0 and 15, preferably between 4 and 10, and particularly preferably, are both equal to 7;

n and n', which are identical or different, are between 1 and 5, preferably between 1 and 3 and, in particular, identical and equal to 2;

p and p' have the value 0, 1 or 2 and are preferably zero;

R is an alkyl group, in particular methyl, ethyl or propyl, the first two groups mentioned being preferred;

R' and R" each represent an alkyl group or a hydrogen atom;

X is a halogen atom, preferably chlorine.

In the particularly favourable case when the two compounds which coexist in the composition of the invention are a trialkoxysilane and a trihalosilane, that is to say when p=p'=0, the most abrasion-resistant hydrophobic/oleophobic coatings were obtained for comparable molar concentrations of the two silanes. In this embodiment of the invention, a molar ratio of the alkoxysilane to the halosilane of between 80:20 and 20:80, or advantageously between 60:40 and 40:60, is therefore recommended.

The invention furthermore relates to the following:

1) a process for forming a hydrophobic/oleophobic coating on a substrate, which comprises the steps consisting in:

cleaning the substrate, preferably applying a primer, such as one comprising a silane having three or four hydrolysable functional groups, applying a composition according to the invention, and subjecting the system to a heat treatment, this operation being optional;

2) a ready-to-use kit for hydrophobic/oleophobic treatment, consisting of a receptacle containing a composition as described above, and not requiring the separate addition of any catalyst or auxiliary treatment agent (the possibility of forming the coating by application of a single composition is of obvious practical benefit to the user, and constitutes one of the major advantages provided by the invention);

3) a substrate on which a hydrophobic/oleophobic coating has been formed from a composition according to the invention; and 4) monolithic, laminated or multiple glazing of which at least one outer glass or plastic face is at least in part provided with a hydrophobic/oleophobic coating formed from a composition according to the invention.

As regards this last subject of the invention:

"monolithic glazing" means glazing consisting of a single pane of glass or sheet of plastic such as polycarbonate, poly(methyl methacrylate), etc.;

"laminated glazing" means a stack of several panes or sheets bonded to one another, for example panes of glass or sheets of plastic fixed to one another by means of adhesive layers made of polyvinyl butyral, polyurethane, etc.; and "multiple glazing" means a combination of sheets or panes that are unconnected, that is to say in particular separated from one another by layers of air.

In the context of the invention, "outer face" of the glazing means a surface in contact with the surrounding atmosphere. This may be the surface of a window of a motor vehicle or a building that may come into contact with rain or organic liquids, or alternatively a shower window or the like, etc.

Other characteristics and advantages of the invention will become apparent from the following examples:

EXAMPLES

Identical float-glass substrates are treated using solutions of $F_3C(CF_2)_7(CH_2)_2SiCl_3$ and/or $F_3C(CF_2)_7(CH_2)_2Si(OC_2H_5)_3$ in decane or in a perfluorinated solvent marketed by 3M under the reference "Fluorinert FC 77". The total amount of triethoxysilane and trichlorosilane contained by weight is 2.5%, and when these two compounds are present at the same time, it is in a proportion of 1.25% by weight each.

The substrate is cleaned beforehand with RBS soap or with a solution of cerium oxide at a strength of 20% by weight.

In some, but not all, of the tests the cleaned substrate is treated with a primer solution based on $Si(OCH_3)_4$ in a medium made up of ethanol/(water+HCl 0.3N):90/10 by weight.

The aforementioned solution of hydrophobic/oleophobic silane(s) is applied using an impregnated support such as a rag.

In some of the tests only, the substrate is lastly subjected to an 80° C. heat treatment for 8 hours.

Each substrate which is treated is evaluated on the basis of the following three criteria:

measurement of the initial water contact angle gives a quantitative indication of the hydrophobic nature of the substrate immediately after the treatment;

the amplitude of the $v(CF_2)$ extension vibration band absorbing towards 1,146 $cm^{-1}$, studied using FTIR spectroscopy, indicates the density of the $CF_2$ functional groups grafted onto the substrate;

measurement of the water contact angle during the Taber test carried out using CS 10 F grinder wheels, with a force of 500 g being applied, is a quantitative indication of the hydrophobic character of the substrate which is treated, after having been provided with its coating, when subjected to 60 revolutions and 100 revolutions of abrasion, respectively, by the grinder wheels. This measurement therefore makes it possible to evaluate the abrasion resistance of the grafted hydrophobic/oleophobic coating.

The results are reported in the appended table, in which the following abbreviations are used:

the hydrophobic agents are denoted by numbers:

$F_3C(CF_2)_7(CH_2)_2SiCl_3$: ① and $F_3C(CF_2)_7(CH_2)_2Si(OC_2H_5)_3$: ②;

if the substrate is cleaned using a cerium oxide solution, this is indicated by the sign *; if not otherwise indicated, the substrate is cleaned with RBS soap;

optional preparation of the substrate using a primer is indicated by the sign ⊕;

the decane and perfluorinated solvents are respectively denoted by solvent d and solvent p.

Comparing Examples 1 and 2 illustrates the superiority of the perfluorinated solvent over decane. A slight increase is observed in the initial hydrophobic character as well as the durability (water contact angles initially and during the Taber test). Even more significant is the increase in the density of $CF_2$ groups grafted onto the substrate.

To be precise, the thickness of the deposits of Examples 1 and 2, determined by X-ray reflectometry, is of the order of 17 Å in both cases. The greater amounts of $CF_2$ detected in the perfluorinated solvent can be attributed to better organization of the grafted layer in this solvent, i.e. better coverage, a better grafting ratio and a lower number of zones without fluorinated silane.

Example 3 employs a perfluorinated triethoxysilane as the only hydrophobic agent; it is characterized by a relatively small initial water contact angle. Moreover, the density of the grafted $CF_2$ groups is below the $10^{-3}$ detection threshold.

Example 5 should be compared both with Example 2 and Example 3. An increase in the initial contact angle is observed. Put another way, the hydrophobic property is imparted by the mixture of agents (①+②) to a greater degree than by agent ① or agent ② alone. Furthermore, the durability performance, demonstrated by the results of the last column of the table, are at a very good level.

As indicated in Example 4, which should be considered in comparison with Example 5, initial cleaning of the substrate with RBS soap is slightly inferior to cleaning with cerium oxide as regards the three properties evaluated.

According to Example 6, in relation with Example 4, the lack of a primer results principally in a loss of durability.

Examples 7 and 8 are respectively to be compared with Examples 4 and 5. The improvement in durability due to the heat treatment is substantial only in the case of cleaning the substrate with RBS soap.

These results establish the synergy of the perfluorinated trialkoxysilane and the perfluorinated trichlorosilane in obtaining a high level of hydrophobicity and abrasion resistance for the grafted coating.

| Example No. | Deposition conditions | Initial water contact angle | Value in absorbency units of the ν(CF₂) extension vibration absorbing towards 1,146 cm⁻¹ | Water contact angle during the Taber test |
|---|---|---|---|---|
| 1 | ① in solvent d ★ ⊕ | 106° ± 1° | <10⁻³ | 78° ± 3° after 60 revs 65° ± 4° after 100 revs |
| 2 | ① in solvent p ★ ⊕ | 107° ± 1° | 2 × 10⁻³ | 80° ± 2° after 60 revs 68° ± 5° after 100 revs |
| 3 | ② in solvent p ★ ⊕ | 92° ± 1° | <10⁻³ | 64° ± 4° after 60 revs |
| 4 | ① + ② in solvent p ⊕ | 107° ± 1° | 1.4 × 10⁻³ | 84° ± 3° after 60 revs 70° ± 3° after 100 revs |
| 5 | ① + ② in solvent p ★ ⊕ | 109° ± 1° | 1.5 × 10⁻³ | 91° ± 3° after 60 revs 81° ± 3° after 100 revs |
| 6 | ① + ② in solvent p | 106° ± 1° | 1.7 × 10⁻³ | 66° ± 3° after 60 revs |
| 7 | ① + ② in solvent p ⊕ with heat treatment | 105° ± 1° | 1.6 × 10⁻³ | 99° ± 1° after 60 revs 95° ± 1° after 100 revs |
| 8 | ① + ② in solvent p ★ ⊕ with heat treatment | 108° ± 1° | 1.8 × 10⁻³ | 92° ± 4° after 60 revs 80° ± 2° after 100 revs |

What is claimed is:

1. A composition, comprising at least one alkoxysilane and at least one halosilane, each having a perfluorinated group at at least one end of the molecule.

2. The composition of claim 1, wherein said alkoxysilane has the formula

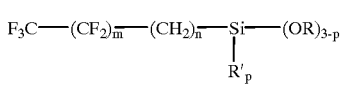

(I)

wherein:

m is 0 to 15;

n is 1 to 5;

p is 0, 1 or 2;

R is alkyl; and

R' is hydrogen or alkyl.

3. The composition of claim 2, wherein p is 0.

4. The composition of claim 2, wherein R is methyl, ethyl or propyl.

5. The composition of claim 1, wherein said halosilane has the formula (II):

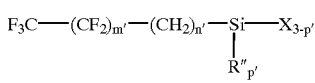

(II)

wherein:

m' is 0 to 15;

n' is 1 to 5;

p' is 0, 1 or 2;

X is halogen; and

R" is hydrogen or alkyl.

6. The composition of claim 5, wherein p' is 0.

7. The composition of claim 5, wherein X is chlorine.

8. The composition of claim 1, wherein the molar ratio of alkoxysilane to halosilane is between 80:20 and 20:80.

9. The composition of claim 8, wherein the molar ratio of alkoxysilane to halosilane is between 60:40 and 40:60.

10. The composition of claim 1, wherein said alkoxysilane is a trialkoxysilane, and said halosilane is a trihalosilane.

11. The composition of claim 1, which further comprises a perfluorinated organic solvent, whereby said composition is a solution.

12. The composition of claim 1, wherein said at least one alkoxysilane is $$F_3C(CF_2)_7(CH_2)_2Si(OC_2H_5)_3.$$

13. The composition of claim 1, wherein said at least one halosilane is $$F_3C(CF_2)_7(CH_2)_2SiCl_3.$$

14. A process for forming a hydrophobic/oleophobic coating on a substrate, which comprises:

a) cleaning the substrate; and b) applying a composition containing at least one alkoxysilane and at least one halosilane, each having a perfluorinated group at at least one end of the molecule.

15. The process of claim 14, which further comprises, after cleaning the substrate, in step a), applying a primer to said substrate, before applying said composition.

16. The process of claim 15, wherein said primer comprises a solution based on Si(OCH₃)₄ in a medium made of ethanol/(aqueous HCl 0.3N):90/10 by weight.

17. The process of claim 14, which further comprises after applying said composition in step b), subjecting the coated substrate to a heat treatment.

18. The process of claim 14, wherein said substrate is cleaned with a solution of cerium oxide at a strength of 20% by weight.

19. The process of claim 14, wherein said substrate is a glazing.

20. The process of claim 19, wherein said glazing is made of glass or plastic.

21. The process of claim 20, wherein said plastic is selected from the group consisting of poly(methyl methacrylate), polyvinyl butyral, polycarbonate and polyurethane.

22. The process of claim 14, wherein said substrate having said composition applied thereto exhibits an initial water contact angle by Taber test of 92°±1° to 109°±1°.

23. The process of claim 14, wherein said substrate having said composition applied thereto exhibits a water contact angle by Taber test of 63°±4° to 99°±1° after 60 revs.

24. The process of claim 14, wherein said substrate having said composition applied thereto exhibits a water contact angle by Taber test of 65°±4° to 95°±1° after 100 revs.

* * * * *